United States Patent [19]

Klein

[11] Patent Number: 4,734,542
[45] Date of Patent: Mar. 29, 1988

[54] FLAT TUBULAR JACKET
[75] Inventor: Laurence R. Klein, Torrance, Calif.
[73] Assignee: The Zippertubing Company, Los Angeles, Calif.
[21] Appl. No.: 918,144
[22] Filed: Oct. 14, 1986

Related U.S. Application Data

[63] Continuation of Ser. No. 813,826, Dec. 27, 1985.

[51] Int. Cl.$^4$ .............................................. H01B 7/34
[52] U.S. Cl. .............................. 174/36; 174/DIG. 11
[58] Field of Search ......................... 174/36, DIG. 11

[56] References Cited

U.S. PATENT DOCUMENTS

| | | | |
|---|---|---|---|
| 3,582,532 | 6/1971 | Plummer | 174/36 |
| 4,202,457 | 5/1980 | Tansi | 174/53 X |
| 4,391,303 | 7/1983 | Holgersson | 174/68 C X |
| 4,409,427 | 10/1983 | Plummer, III | 174/36 |
| 4,461,076 | 7/1984 | Plummer, III | 174/36 X |
| 4,572,922 | 2/1986 | Plummer, III | 174/36 |

Primary Examiner—Morris H. Nimmo
Attorney, Agent, or Firm—Christie, Parker & Hale

[57] ABSTRACT

Disclosed is a flat tubular jacket of flexible sheet plastic having a separable interlocking seam bridging the overlapping opposite lateral edges of an elongated one piece main body for use in snugly enclosing one or more ribbon cable conductors. The interior of the main body is provided with heat-formed grooves to either side of the jacket seam and spaced apart generally by the width of the ribbon cable conductors. A shielding lining of flexible conductive material is secured to the inner side of the jacket and has overlapping edges in electrical contact.

12 Claims, 3 Drawing Figures

FLAT TUBULAR JACKET

This is a continuation of my copending application for U.S. patent Ser. No. 06/813,826 filed Dec. 27, 1985 entitled Flat Tubular Jacket and Method.

This invention relates to jacketing for ribbon cable conductors having an improved one piece main body of nonconductive material provided with a separable interlocking access seam and at least one pair of grooves along diametrically opposed interior surface areas thereof and having an attached conductive lining to provide electrical shielding for one or more ribbon cables.

BACKGROUND OF THE INVENTION

Ribbon cables are widely used to interconnect electrical components and have need for electrical shielding. A wide variety of electrically shielded jacketing is available for protecting round cabling. Such shielding is generally circular in cross section and is generally unsuitable as a shielded enclosure for ribbon cabling. Such jacketing does not lie flat against the opposite sides of the ribbon cables, is bulky unsightly and tends to curl the ribbon cabling into a coil about its longitudinal axis. The U.S. Pat. No. 3,582,532 granted to Plummer in 1971 does avoid many of the objections to shielded jacketing for round cables but has shortcomings avoided by this invention. The main body of the Plummer jacketing utilizes multiple strips of plastic sheeting required to be cut to size and precisely superimposed while being heat fused together along the opposite lateral sides of the assembly. The resulting product does lie flat against the opposite sides of ribbon cabling but is very substantially wider than the cabling being shielded, uses excess material and is time consuming and costly to manufacture.

SUMMARY OF THE INVENTION

The shortcomings and disadvantages of prior detachable shielding jackets are avoided by this invention which provides a one piece longitudinally seamed shielding jacket specially designed for use with ribbon cables. The main body of the jacket comprises a single elongated strip of supple plastic sheeting tailored to snugly enclose one or more ribbon cables. Diametrically opposed portions of the inner surface are longitudinally grooved to form hinges separated by a distance slightly greater than the width of ribbon cabling to be enclosed. The lateral edges of the main body are heat sealed to a pair of separable interlocking seam members so as to provide a guard flap underlying and bridging the closed seam. An electrically conductive lining has one edge secured to the edge of the guard flap and has a width adequate to embrace ribbon cables with its opposite edges in overlapping contact with one another. If more than a pair of ribbon cables are to be enclosed the main body is preferably provided with two pairs of hinge-forming grooves the adjacent ones of which are spaced apart by the approximate thickness of the cables to be enclosed.

Accordingly, it is a primary object of this invention to provide an improved flat protective enclosure for one or more ribbon cables.

Another object of the invention is the provision of a unitary seamed protective jacketing for ribbon cables having hinge-forming grooves extending along the opposite lateral edges thereof.

Another object of the invention is the provision of a unitary seamed jacket for ribbon cables having a flexible electrical shielding lining completely embracing one or more ribbon cables.

Another object of the invention is the provision of a flat unitary electrically shielded jacket for compactly enclosing ribbon cabling with hinges extending along its opposite lateral edges and integral with the main body of the jacket.

These and other more specific objects will appear upon reading the following specification and claims and upon considering in connection therewith the attached drawing to which they relate.

Referring now to the drawing in which a preferred embodiment of the invention is illustrated:

Figure 1:
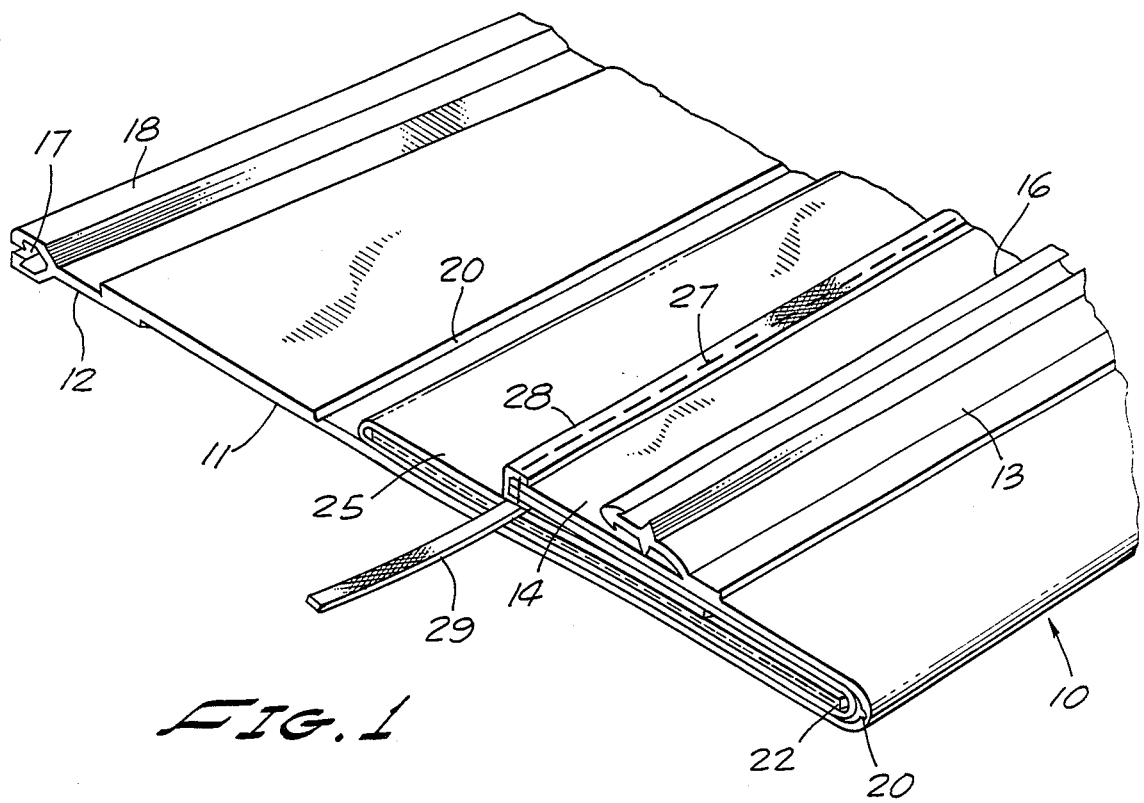
FIG. 1 is a perspective view of one illustrative embodiment of the invention shielded jacketing with a single ribbon cable embraced by the shielded lining and one side of the jacket hinged to its open position.

Referring to FIG. 1, there is shown a first preferred embodiment of a compactly folding flat shielded jacketing for ribbon tape designated generally 10. This jacket has a main body formed by a single strip of supple sheet plastic 11 having a pair of separable interlocking seam forming tapes 12, 13 heat fused to the lateral edge portions thereof. Preferably, seam member 13 is secured to the exterior of the main body sufficiently spaced from the adjacent edge to provide a guard flap 14 sufficiently wide to underlie and bridge the two seam members when interlocked with one another.

As herein shown, the two seam members are extruded from flexible plastic material. Member 13 has an arrowhead 16 along its free edge having a snug interlocking fit within a complementarily shaped female slot 17 opening laterally through the edge 18 of the companion seam member 12. The two seam members are representative of various interlocking separable seams well known to persons skilled in this art and are progressively mateable with one another by the aid of an operating slider not shown, but of well known construction.

Figure 3:
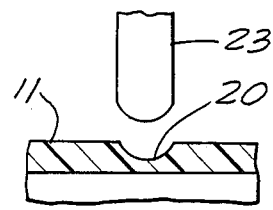
FIG. 3 is a fragmentary diagrammatic view through one of the hinged grooves of the main body underlying the lower edge of a platen employed in forming the hinge groove.

The underside of main body 11 is shown with a single pair of hinged grooves 20, 20 parallel to the seam members and spaced apart by approximating the width of a unit of ribbon cable conductors 22. Such conductors are encased in insulation and attached to one another to form a single layer of parallel conductors. Hinge grooves 20 are formed by depressing an elongated heated platen 23 (FIG. 3) until the surface of the plastic softens and becomes displaced to form a permanent hinge groove 20. The lateral edge portions of the jacket then readily fold into overlapping relation to provide a flattened tube accommodating and enclosing the ribbon cable 22.

Jacket 10 also includes electrical shielding comprising an elongated strip of flexible electrical conductive material 25 having substantially the same width as the main body 11 of the jacket. The shielding liner 25 for the jacket may comprise aluminum or copper foil, ductile wire netting etc. As herein shown the shielding liner is attached to the edge of the guard flap 14 by stitching 27 and a U-shape strip of foil 28 embracing the edge of the shielding and the edge of the guard flap. Stitching 27 also preferably serves to secure a braided metallic grounding lead 29 to the innermost side of strip 28. Except for the securing stitching 27, the shielding liner 25 need not be otherwise secured to the main body of the jacket. It is important that the shielding liner be sufficiently wide to completely embrace the ribbon cable with its free edge overlapping and overlying the portion secured to the main body by stitching 27.

In use, the opposite flaps of the jacket main body are opened to lie against a supporting surface and the free edge of the shielding liner is outstretched above the main body in readiness to receive the ribbon cable 22. The shielding liner is then closed to the position shown in FIG. 1 following which the two sides of the jacket are folded about the hinged grooves 20 and the seam members are pressed into interlocking engagement. As will be evident the ribbon cable is not only completely enclosed but the opposite edges of the shielding liner overlap and lie flush against one another. The assembled one piece unitary jacket occupies a minimum of space with the opposite sidewalls of both the shielding liner and the jacket itself lying flat and snugly against the ribbon conductors.

Figure 2:
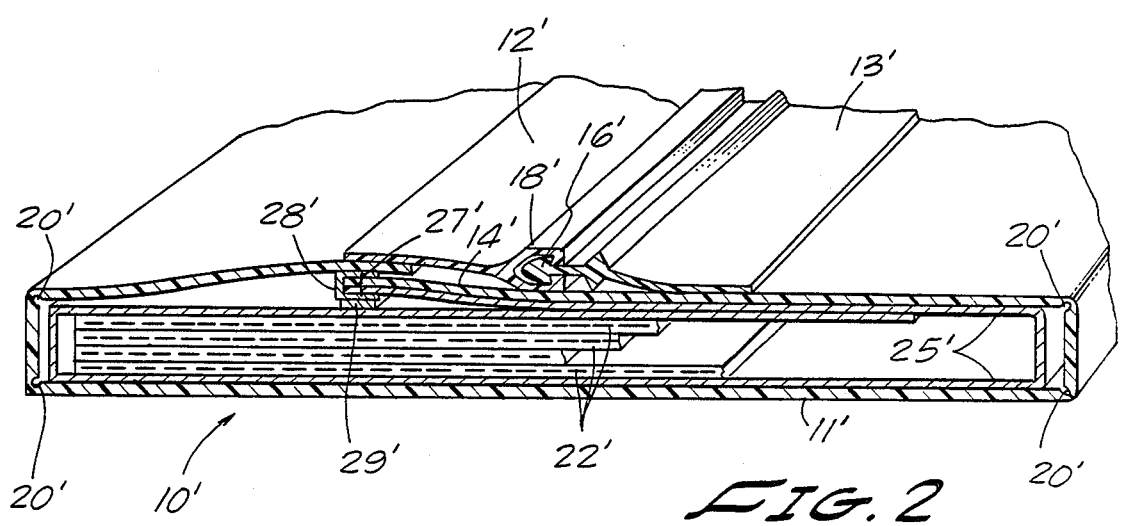
FIG. 2 is a cross sectional perspective view of a second illustrative embodiment of the jacket assembled about a plurality of ribbon cables.

The second embodiment shown in FIG. 2 differs from the first described embodiment in that the main body is provided with two pairs of hinged grooves 20 thereby snugly accommodating a plurality of ribbon conductors. Accordingly, the same reference characters used in describing FIG. 1 have been applied to the FIG. 2 embodiment and distinguished by the addition of a prime. It will therefore be evident that the FIG. 2 embodiment has all the advantages of the first described embodiment. The presence of two pairs of hinged grooves 20′ provides a closed assembly of generally rectangular configuration having a thickness only slightly greater than the combined thickness of a plurality of superimposed ribbon cables 22′.

Although both species of the invention have been described as having an electrical shielding liner, this liner may be omitted if electrical shielding is not necessary. With or without the electrical shielding, the invention unitary jacket provides a flat tubular enclosure for a single ribbon container or a plurality thereof.

While the particular flat tubular jacket and method herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. A generally flat jacket for enclosing one or more ribbon cable conductors comprising:
   a one piece elongated main body of supple sheet plastic with its opposite lateral edges foldable into overlapping relation with one another;
   separable interlocking seam means secured along the exterior side of said lateral edges for separably holding the edges overlapped; and
   the inner side of said main body being planar except for a pair of hinge grooves depressed into the planar face of the body, each groove extending continuously therealong approximately equal distances from each side of said seam means and parallel to one another and sufficiently rounded for providing hinge means for folding the body along the respective hinge grooves about 180 degrees so that opposite flat portions of the folded body may contact each other and for overlapping the opposite lateral edges of the body to form a flat jacket.

2. A flat jacket for ribbon cable conductors as defined in claim 1 characterized in that one of the lateral edges of said main body includes a guard flap underlying and bridging said interlocking seam means when closed and including a flexible conductive electrical shielding lining for said jacket having a width sufficient for the opposite lateral edges thereof to overlap and lie in contact with one another in encircling relation to one or more ribbon cable conductors; and means for securing a portion only of said shielding lining permanently assembled to the inner side of said main body guard flap.

3. A flap jacket for ribbon cable conductors as defined in claim 2 characterized by a flexible grounding conductor secured lengthwise of and in contact with said shielding lining.

4. A flat jacket for ribbon cable conductors as defined in claim 1 wherein the main body is made of thermoplastic material and each of said grooves has a configuration characteristic of being formed by temporarily pressing the heated rounded edge of a rigid member thereinto to soften the adjacent portion of said sheet plastic main body to form respective hinges therealong.

5. A generally flat tubular jacket for enclosing one or more ribbon cable conductors comprising:
   an elongated unitary flat sheet of supple plastic;
   first and second parallel interlocking seam means for releasably interconnecting opposite longitudinal edge portions of the sheet, the first seam means being nearer one longitudinal edge of the sheet and the second seam means being nearer the opposite longitudinal edge of the sheet; and
   a pair of parallel hinge grooves extending along the length of the sheet and impressed roughly half round into the flat sheet for permitting folding of the sheet approximately 180 degrees, the distance between the grooves being approximately the same as the sum of the distances between the first seam means and one groove, and the second seam means and the other groove, so that when the first and second seam means are interlocked the sheet can be folded along the two grooves and flattened to surround a flat enclosure.

6. A flat jacket for ribbon cable conductors as defined in claim 5 comprising a guard flap along one lateral edge of the body underlying and extending beyond one of said interlocking seam means.

7. A flat jacket for ribbon cable conductors as defined in claim 6 comprising a flexible conductive electrical shielding lining having an edge portion secured to the guard flap and having sufficient width for the opposite lateral edges of the shielding lining to overlap and lie in contact with each other in encircling relation to a ribbon cable conductor within said jacket.

8. A flat jacket for ribbon cable conductors as defined in claim 5 wherein each of the grooves is approximately the same distance from its respective seam means.

9. A generally flat tubular jacket for enclosing one or more ribbon cable conductors comprising;
   an elongated flat sheet of supple plastic having substantially uniform thickness;
   first seam means along a first longitudinal edge of the sheet;

second seam means along the opposite longitudinal edge of the sheet and capable of interlocking with the first seam means for closing the tubular jacket;

a first longitudinal hinge groove parallel to and spaced apart from the first seam means; and a second longitudinal hinge groove parallel to and spaced apart from the second seam means; and wherein each hinge groove is sufficiently broad and flexible to allow folding the jacket along the respective groove approximately 180° so that the jacket is generally flat when folded at the hinge grooves and the first and second seam means are interlocked.

10. A flat jacket for ribbon cable conductors as defined in claim 9 wherein the second hinge groove is spaced apart from the second seam means a distance about the same as the spacing of the first hinge groove from the first seam means.

11. A flat jacket for ribbon cable conductors as defined in claim 9 comprising a guard flap along one lateral edge of the main body underlying and extending beyond one of said interlocking seam means.

12. A flat jacket for ribbon cable conductors as defined in claim 11 comprising a flexible conductive electrical shielding lining having an edge portion secured to the guard flap and having sufficient width for the opposite lateral edges of the shielding lining to overlap and lie in contact with each other in encircling relation to a ribbon cable conductor within said jacket.

* * * * *